(12) United States Patent
Natanzon et al.

(10) Patent No.: US 9,811,431 B1
(45) Date of Patent: Nov. 7, 2017

(54) NETWORKED BASED REPLICATION OF DISTRIBUTED VOLUMES

(71) Applicant: EMC Corporation, Hopkinton, MA (US)

(72) Inventors: Assaf Natanzon, Tel Aviv (IL); Steven Bromling, Edmonton (CA); Saar Cohen, Mishmeret (IL); Jehuda Shemer, Kfar Saba (IL); Alex Solan, Hertzlyia (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/744,565

(22) Filed: Jun. 19, 2015

Related U.S. Application Data

(63) Continuation of application No. 13/077,266, filed on Mar. 31, 2011, now Pat. No. 9,063,994.

(51) Int. Cl.
| | |
|---|---|
| *G06F 7/00* | (2006.01) |
| *G06F 11/20* | (2006.01) |
| *G06F 11/14* | (2006.01) |
| *G06F 17/30* | (2006.01) |

(52) U.S. Cl.
CPC ...... *G06F 11/2069* (2013.01); *G06F 11/1451* (2013.01); *G06F 11/1464* (2013.01); *G06F 11/2058* (2013.01); *G06F 17/30575* (2013.01); *G06F 2201/84* (2013.01)

(58) Field of Classification Search
CPC .................................. G06F 17/30575
See application file for complete search history.

(56) References Cited

U.S. PATENT DOCUMENTS

| | | | | |
|---|---|---|---|---|
| 5,435,004 A | * | 7/1995 | Cox | ..... G06F 11/1466 |
| 2010/0050013 A1 | * | 2/2010 | Soran | ..... G06F 3/0608 |
| | | | | 714/5.11 |

* cited by examiner

*Primary Examiner* — Ajith Jacob
(74) *Attorney, Agent, or Firm* — Krishnendu Gupta; Robert Kevin Perkins

(57) ABSTRACT

A system, method, and computer product for enabling a virtual service layer to consume a first storage medium and a second storage medium and map the storage mediums as one or more virtual storage volumes; wherein the one or more virtual volumes are mirrored at a first site and a second site, mirroring of the virtual storage volumes on a distributed mirror, and enabling a distributed replication service to create a continuous data protection image of the data written to one or more virtual storage volumes.

20 Claims, 12 Drawing Sheets

NETWORKED BASED REPLICATION OF DISTRIBUTED VOLUMES

RELATED APPLICATIONS

This application is related to co-pending US Patent Application, filed Mar. 31, 2011, Ser. No. 13/077,256 entitled "CONSISTENT REPLICATION IN A GEOGRAPHICALLY DISPERSE ACTIVE ENVIRONMENT," which is hereby incorporated by reference in its entirety. This application is related to co-pending US Patent Application, filed Mar. 31, 2011, Ser. No. 13/077,262 entitled "INVERSE STAR REPLICATION," which is hereby incorporated by reference in its entirety. This application is related to co-pending US Patent Application, filed Mar. 31, 2011, Ser. No. 13/077,266 entitled "NETWORKED BASED REPLICATION OF DISTRIBUTED VOLUMES," which is hereby incorporated by reference in its entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A system, method, and computer product for enabling a virtual service layer to consume a first storage medium and a second storage medium and map the storage mediums as one or more virtual storage volumes; wherein the one or more virtual volumes are mirrored at a first site and a second site, mirroring of the virtual storage volumes on a distributed mirror, and enabling a distributed replication service to create a continuous data protection image of the data written to one or more virtual storage volumes.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION

Figure 1:
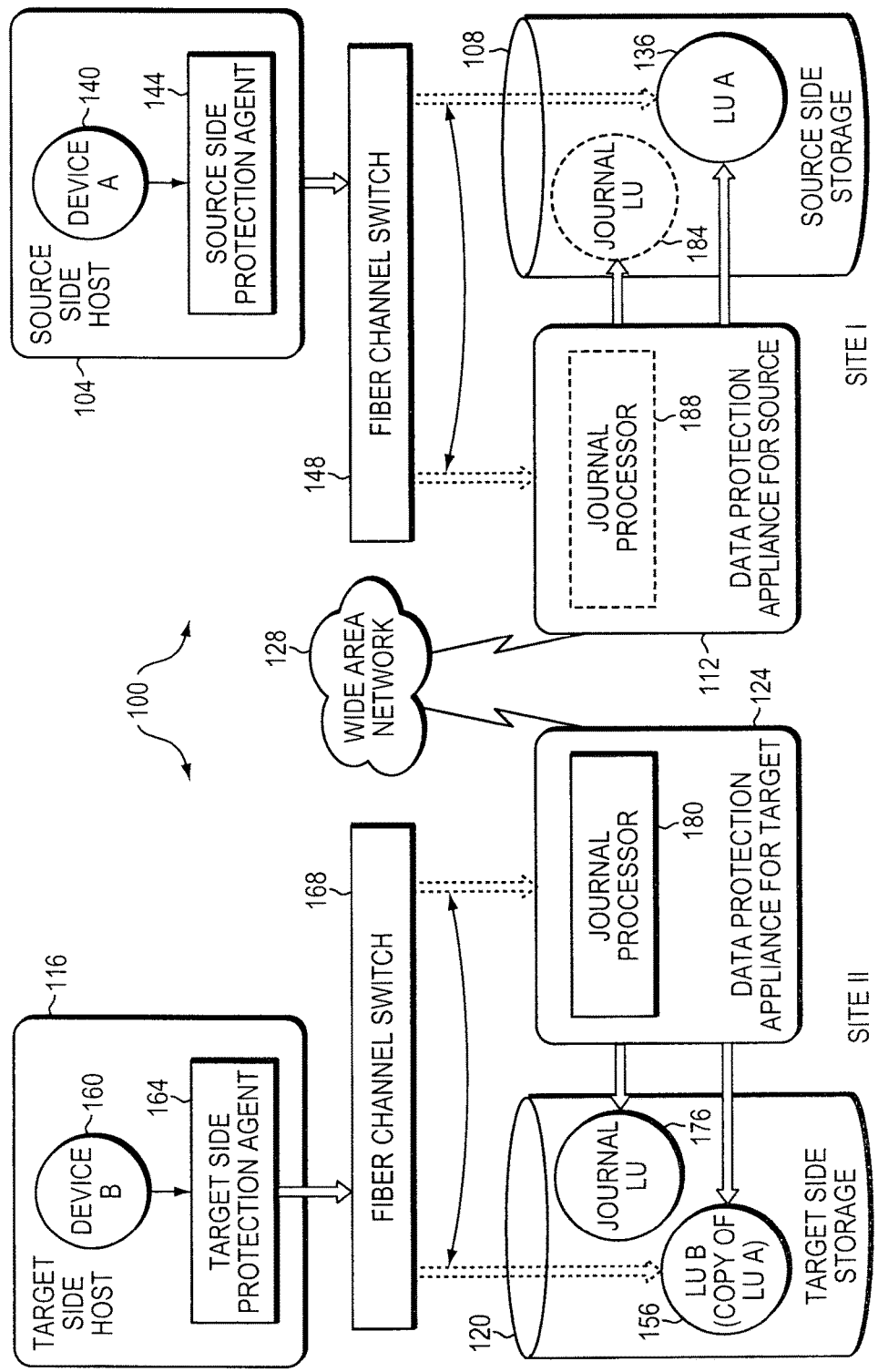
FIG. 1 is a simplified illustration of a data protection system, in accordance with an embodiment of the present invention.

In some embodiments of the instant disclosure, journal based replication may be integrated with a virtual service layer. In certain embodiments, one or more splitters may be integrated into the virtual service layer. In further embodiments, the virtual service lay may span multiple sites, and the sites may be at different geographic locations. In certain embodiments, each site may have one or more nodes and each node may have a splitter.

In some embodiments, at some sites, the splitter may replicate the I/O. At other sites, a splitter may mark the I/O without performing replication. In certain embodiments, there may be a protocol between the splitters in the virtual service layer. In other embodiments, the protocol may enable the marked data to be cleared periodically for the splitter in the marking mode. In further embodiments, in case of a disaster in one of the sites, replication at one site of the virtual service layer may failover to another site in the virtual service layer and replication may continue. In alternative embodiments, the virtual service layer may enable replication and data protection at a local level, at a metropolitan level or distance, and at a geo or geographic distance. In certain embodiments, a metro distance may be considered one where data recorded at one site may be transmitted to a second site within a certain latency. A geo distance may be a distance where data transmitted between sites is greater than the aforementioned latency.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site
CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
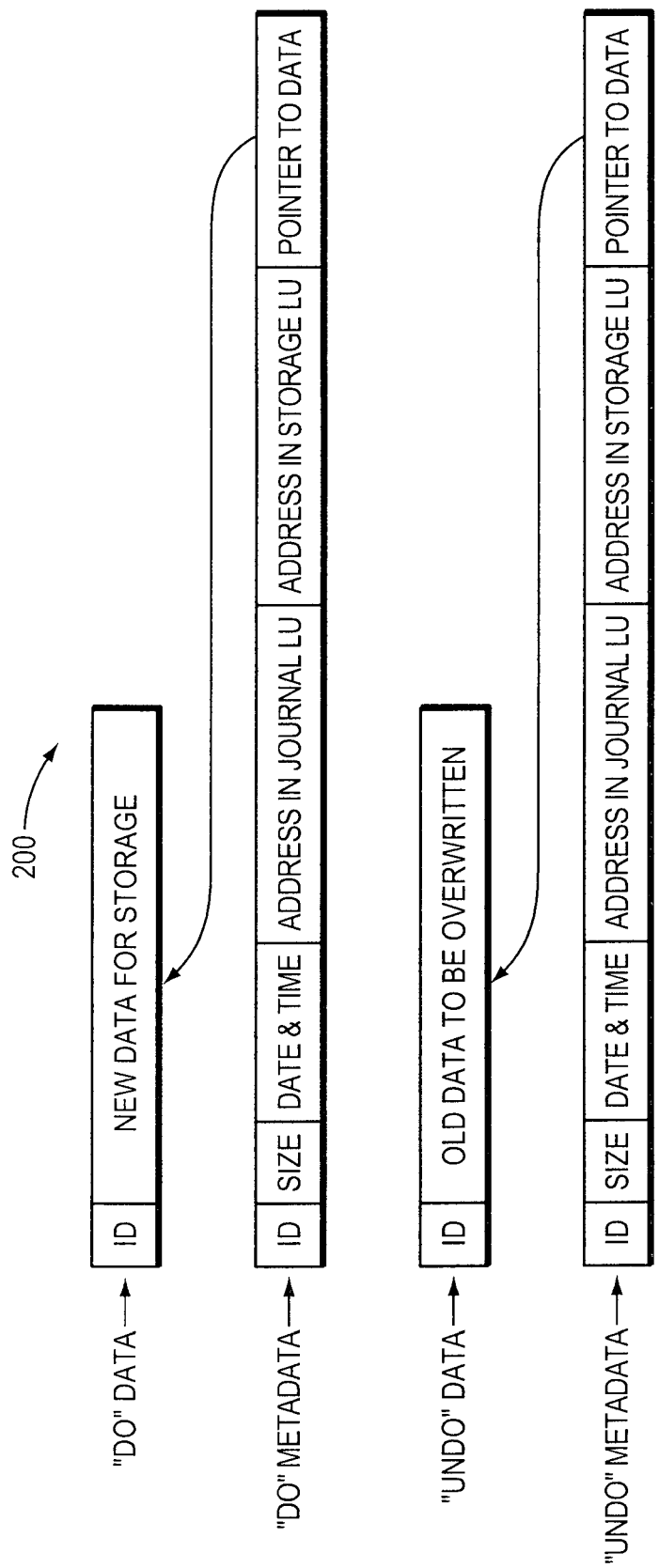
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Virtual Service Layer

Typical server environments have one or more hosts access storage. Conventionally, some of the hosts may be virtual hosts or virtual machines. Generally, each virtual machine or host has a LUN or logical unit corresponding to storage space it may access. Typically, this LUN corresponds to a portion of one or more physical disks mapped to the LUN or logical drive.

Conventional Server virtualization products may have developed the capability to execute migrations of virtual machines, the underlying storage, or both to address load balancing and high availability requirements with certain limitations. Typically, conventional solutions usually require disruptive failover (i.e. failure of one site to transfer the processes to the back-up site), merged SANs, and do not work with heterogeneous products. Thus, in typical systems, if a Virtual Machine were migrated to another environment, such as a server at another location outside of a site, the virtual machine would no longer have read write access to the LUN. However, it is desirable to be able to migrate a virtual machine and have it be able to have read write access to the underlying storage.

In certain embodiments of the instant disclosure, storage resources are enabled to be aggregated and virtualized to provide a dynamic storage infrastructure to complement the dynamic virtual server infrastructure. In an embodiment of the current invention, users are enabled to access a single copy of data at different geographical locations concurrently, enabling a transparent migration of running virtual machines between data centers. In some embodiments, this capability may enable for transparent load sharing between multiple sites while providing the flexibility of migrating workloads between sites in anticipation of planned events. In other embodiments, in case of an unplanned event that causes disruption of services at one of the data centers, the failed services maybe restarted at the surviving site with minimal effort while minimizing recovery time objective (RTO).

In some embodiments of the current techniques the IT infrastructure including servers, storage, and networks may be virtualized. In certain embodiments, resources may be presented as a uniform set of elements in the virtual environment. In other embodiments of the current techniques local and distributed federation is enabled which may allow transparent cooperation of physical data elements within a single site or two geographically separated sites. In some embodiments, the federation capabilities may enable collection of the heterogeneous data storage solutions at a physical site and present the storage as a pool of resources. In some embodiments, virtual storage is enabled to span multiple data centers In some embodiments, virtual storage or a virtual storage layer may have a front end and a back end. The back end may consume storage volumes and create virtual volumes from the consumed volumes. The virtual volumes may be made up of portions or concatenations of the consumed volumes. For example, the virtual volumes may stripped across the consumed volumes or may be made up of consumed volumes running a flavor of RAID. Usually, the front-end exposes these volumes to hosts.

An example embodiment of a virtual service layer or virtual service appliance is EMC Corporation's Vplex®. In some embodiments of the instant disclosure, a storage virtualization appliance has a back-end exposes LUNs to hosts and a front-end which talks to storage arrays, which may enable data mobility. In certain embodiments, storage may be added or removed from the virtual service layer transparently to the user In most embodiments, the virtual service layer enables cache coherency. Thus, in certain embodiments of the current techniques, the storage volumes, in a virtualized server environment, which comprise the encapsulation of a virtual machine may be coherently co-located in two sites, enabling simultaneous, local access by the virtual machine regardless of whether the virtual machine is located on the local or remote site.

In other embodiments, cooperative clustering of the virtualization server nodes may allow for active/active, concurrent read/write access to one or more federated storage devices across the sites. In further embodiments, concurrent access may occur even if the data has not yet been fully copied between the two sites. In at least some embodiments of the current techniques, it is enabled to reference the source copy in this case, preserving seamless, continuous operation.

In certain embodiments of the current disclosure, movement of the virtual machines between the two sites is facilitated. In some embodiments, LUN level access is active/active, any single virtual machine may execute on only one node of the cluster. In further embodiments, enabling of migration of virtual machine instances may enable the migration of the I/O load (specifically read workloads) to storage devices located in the site where the active node resides for any given virtual machine.

In some embodiments of the current techniques, the ability to migrate a VM may be enabled through the use of one or more federated virtual volume. In certain embodiments, a virtual machine or application may communicate through a network with a module which presents virtual volumes to the application or virtual machine. In further embodiments the network may be a SAN. In at least some embodiments, this module may provide a level of abstraction between the storage and the requests for storage made by a virtual machine or other application. In these embodiments, the module may map the logical drive presented to the VM or application to the storage device. In certain embodiments, the module may be transparent to the storage request, the application or VM functioning as it is accessing a logical drive across a network. In other embodiments the network may be a SAN. In other embodiments, regardless of location of the VM, the VM may attempt to reach the LUN provided by the module, which may map the VM request to the appropriate storage.

In some embodiments of the current invention, a clustering architecture enables servers at multiple data centers to have concurrent read and write access to shared block storage devices. In alternative embodiments of the current invention, load sharing between multiple sites while providing the flexibility of migrating workloads between sites in anticipation of planned events such as hardware maintenance is enabled. In further embodiments, in case of an unplanned event that causes disruption of services at one of the data centers, the failed services may be quickly and easily restarted at the surviving site with minimal effort.

In most embodiments, the module may communicate with a second module at the second site to facilitate the one or more federated logical drive. In some embodiments, if a VM were to be moved from the first site to the second site the VM would attempt to access storage through the second module. In most embodiments, the move would be transparent to the VM as it would simply reach out to access the storage and the module on the second site would re-direct the request to the storage on the second site. In some embodiments, the module on the second site would direct the request to the data on the second site. In some embodiments, the storage may be kept in sync using a mirror, the VM may access a current version of the data, regardless of on which site the VM is located. The modules at the first and second site may be in communication with each other.

In some embodiments, disparate storage arrays at two separate locations may be enabled to appear as a single, shared array to application hosts, allowing for the easy migration and planned relocation of application servers and application data, whether physical or virtual. In other embodiments, effective information distribution by sharing and pooling storage resources across multiple hosts may enabled. In further embodiments, manage of virtual environment may be enabled to transparently share and balance resources across physical data centers, ensure instant, real-time data access for remote users, increase protection to reduce unplanned application outages, and transparently share and balance resources within and across physical data centers.

In further embodiments, concurrent read and write access to data by multiple hosts across two locations may be enabled. In other embodiments, realtime data access to remote physical data centers without local storage may be enabled. In some embodiments, the virtual service layer may be implemented by EMC's VPLEX or the like.

Figure 3:
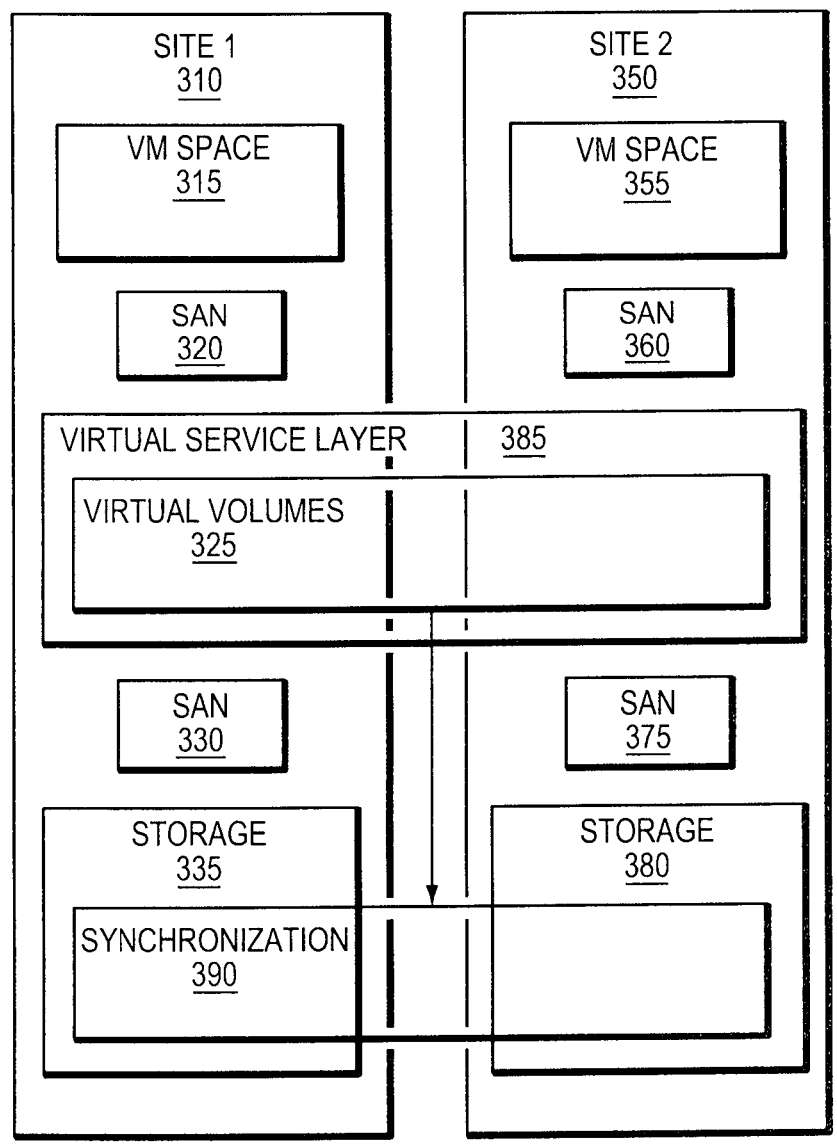
FIG. 3 is a simplified illustration of sites with a virtual service layer, in accordance with an embodiment of the present invention.

Refer to the example embodiment of a virtual service layer of FIG. 3. In the embodiment of FIG. 3, there are two sites 310, 350. Each site has a respective VM space or a space able to run virtual machine, 315, 355, SANs, 320, 330, 360, and 375 and storage 335, 380, respectively. The two sites also have a virtual service later 385, which presents virtual volumes 325. The synchronization 390 of the storage 335 is provided by the virtual service layer 385. In the embodiment of FIG. 3, the same virtual volume may be exposed via the virtual service layer 385. This volume may be kept synchronized so that any VM in VM Space 315 or VM in VM Space 355 accesses the same virtual volume with the same data regardless of in which VM Space, 315, 355, the VM resides.

In some embodiments of the current disclosure, replication and data mobility may be enabled at difference geographic sites. In certain embodiments, this may be enabled by cache coherency functionality. In at least some embodiments, the cache coherency may enable data to be consistent over large distances and be able to be accessed at both geo sites. In a particular embodiment, there may be two geo sites. In this embodiment, if a read is performed on an area of the storage that does not belong to the local site, the read may be delayed and the read may be performed on the remote site. In this embodiment, if a read is performed on an area owned by the local site, then the read may be performed on the local site.

In other embodiments, the geo sites may enforce a write order fidelity mechanism (WOFM) by periodically quiescing or stopping the storage and ensure that the replicated data is consistent. In these embodiments, a checkpoint may be created at each site. This checkpoint may be transmitted to the other site. The other site may flush this checkpoint in order to ensure it has the data as the other site. In these embodiments, only consistent data may be written to the other site. In these embodiments, if a site crashes, then both sites are ensured to have a point in time, where both sites have the same data.

A discussion of some types of virtual storage may be found in U.S. Pat. No. 7,206,863, entitled "SYSTEM AND METHOD FOR MANAGING STORAGE NETWORKS AND PROVIDING VIRTUALIZATION OF RESOURCES IN SUCH A NETWORK" issued on Apr. 17, 2007, to EMC Corp, U.S. Pat. No. 7,770,059, entitled "FAILURE PROTECTION IN AN ENVIRONMENT INCLUDING VIRTUALIZATION OF NETWORKED STORAGE RESOURCES" issued on Aug. 3, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK" issued on Jun. 15, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK USING ONE OR MORE ASICS" issued on Nov. 17, 2009, to EMC Corp, U.S. Pat. No. 7,620,774, entitled "SYSTEM AND METHOD FOR MANAGING STORAGE NETWORKS AND PROVIDING VIRTUALIZATION OF RESOURCES IN SUCH A NETWORK USING ONE OR MORE CONTROL PATH CONTROLLERS WITH AN EMBEDDED ASIC ON EACH CONTROLLER" issued on Nov. 17, 2009, to EMC Corp, U.S. Pat. No. 7,225,317, entitled "SYSTEM AND METHOD FOR MANAGING STORAGE NETWORKS AND FOR MANAGING SCALABILITY OF VOLUMES IN SUCH A NETWORK" issued on May 29, 2007, to EMC Corp, U.S. Pat. No. 7,315,914, entitled "SYSTEMS AND METHODS FOR MANAGING VIRTUALIZED LOGICAL UNITS USING VENDOR SPECIFIC STORAGE ARRAY COMMANDS" issued on Jan. 1, 2008, to EMC Corp, and U.S. Pat. No. 7,216,264, entitled "SYSTEM AND METHOD FOR MANAGING STORAGE NETWORKS AND FOR HANDLING ERRORS IN SUCH A NETWORK" issued on May 8, 2007, to EMC Corp, all of which are hereby incorporated by reference. A discussion of mirroring may be found in U.S. Pat. No. 7,346,805, entitled "PROTECTION OF MIRRORED DATA" issued on Mar. 18, 2008 to EMC Corp, which is hereby incorporated by reference.

Journal Based Replication in a Virtual Storage Layer with a Splitter

In some embodiments of the instant disclosure, a virtual service layer may have journal based replication. In certain embodiments of the instant disclosure, data consistency between different sites serviced by a virtual service layer may be ensured. In most embodiments, one or more splitter may be integrated into the virtual service layer.

Figure 4:
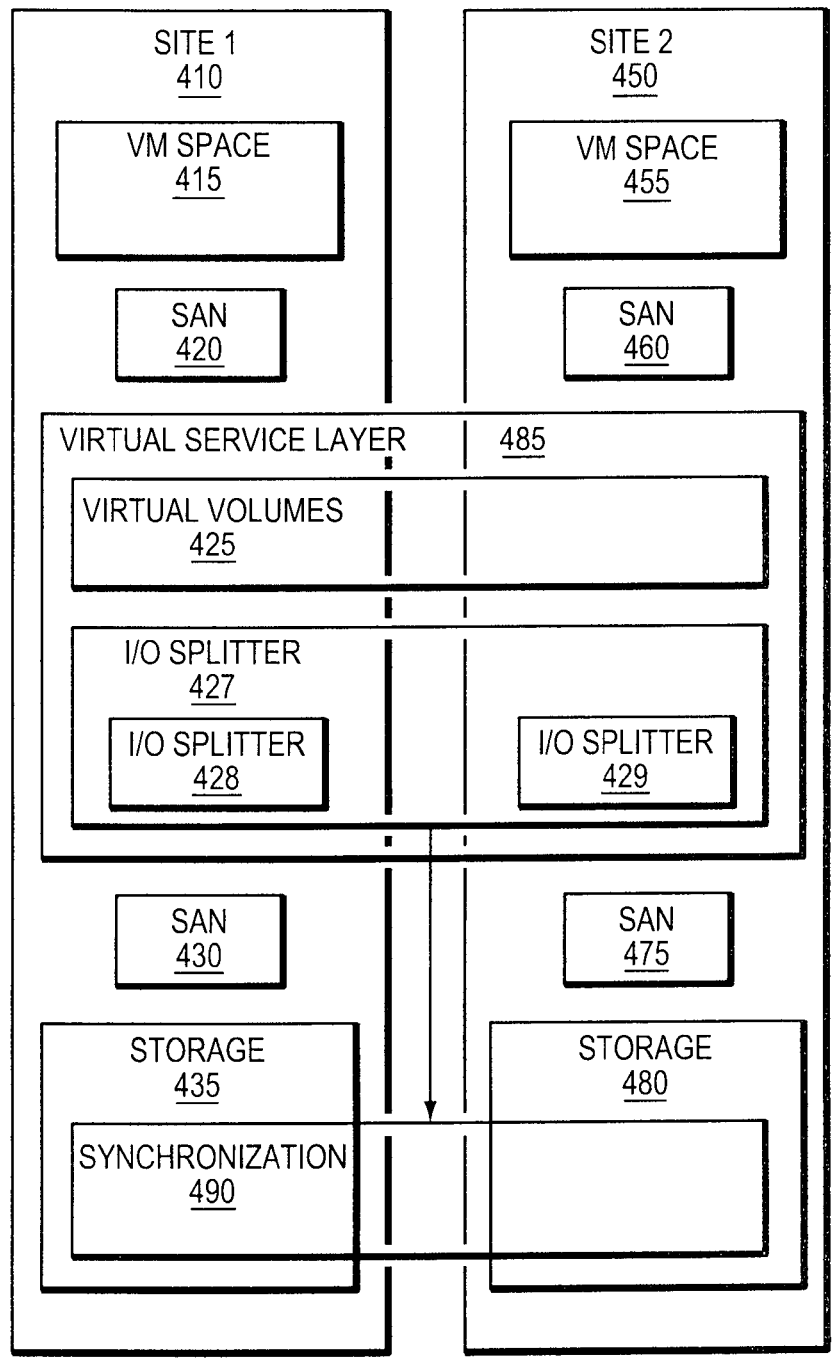
FIG. 4 is an alternative simplified illustration of a virtual service layer with an I/O splitter, in accordance with an embodiment of the present invention.

Refer now to the example embodiment of FIG. 4. In the embodiment of FIG. 4, an I/O splitter has been inserted into the Virtual Service Layer. In these embodiments, the splitter 427 may split I/O occurring at the virtual service layer 485. The I/O Splitter may be made up of one or more splitters in each node at each site. In the example embodiment of FIG. 4, there is one node at each site 410 and 450 and there is one splitter 428, 429, respectively, for each site 410, 450.

Figure 5:
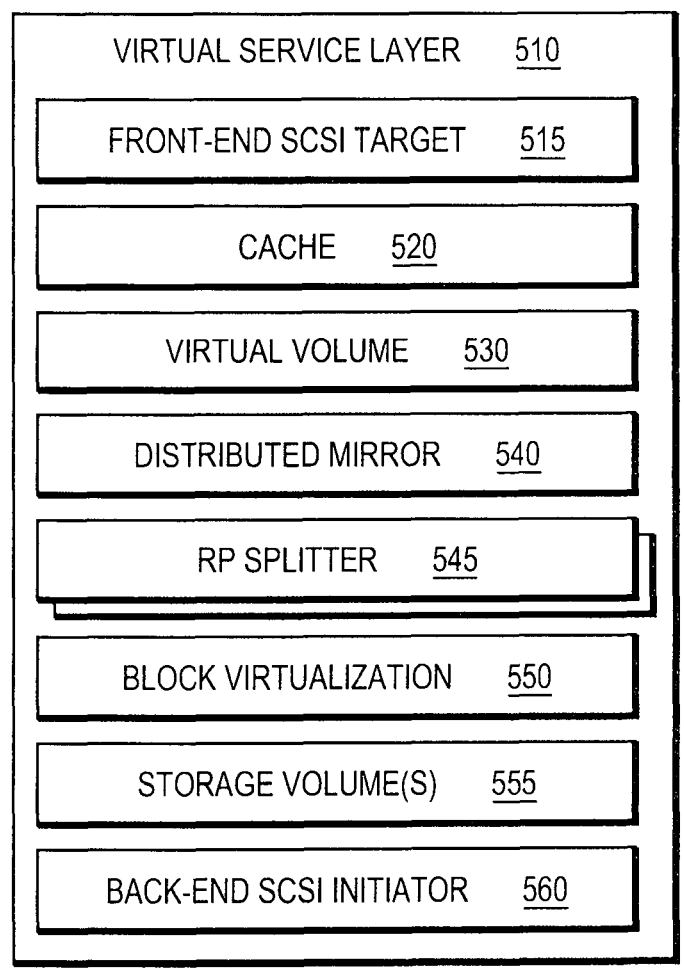
FIG. 5 is a simplified illustration of an implementation of a virtual service layer, in accordance with an embodiment of the present invention.

Refer now to the exemplary embodiment of FIG. 5. The example embodiment of FIG. 5 illustrates a sample virtual service layer divided into underlying layers. In FIG. 5, the Virtual Service Layer 510 has a front-end SCSI target 515 that may be exposed to a host. In FIG. 5, there is also a cache 520. In some embodiments the cache may be a write-through cache. In other embodiments it may be a write-order fidelity cache. In FIG. 5, there is also a virtual volume 530 also exposed to a host or several hosts. The virtual volume may be supported by a distributed mirror 540. A distributed mirror may be a mirror which gives a remote active copy of the volume that is mirrored at another site. The distributed mirror enables mirroring between two geographically disparate sites. There may be a splitter 545 inserted between the virtual volume 530 and the block virtualization 550. As well, there may also be storage volume 555 and a back-end SCSI initiatior 560.

Figure 6:
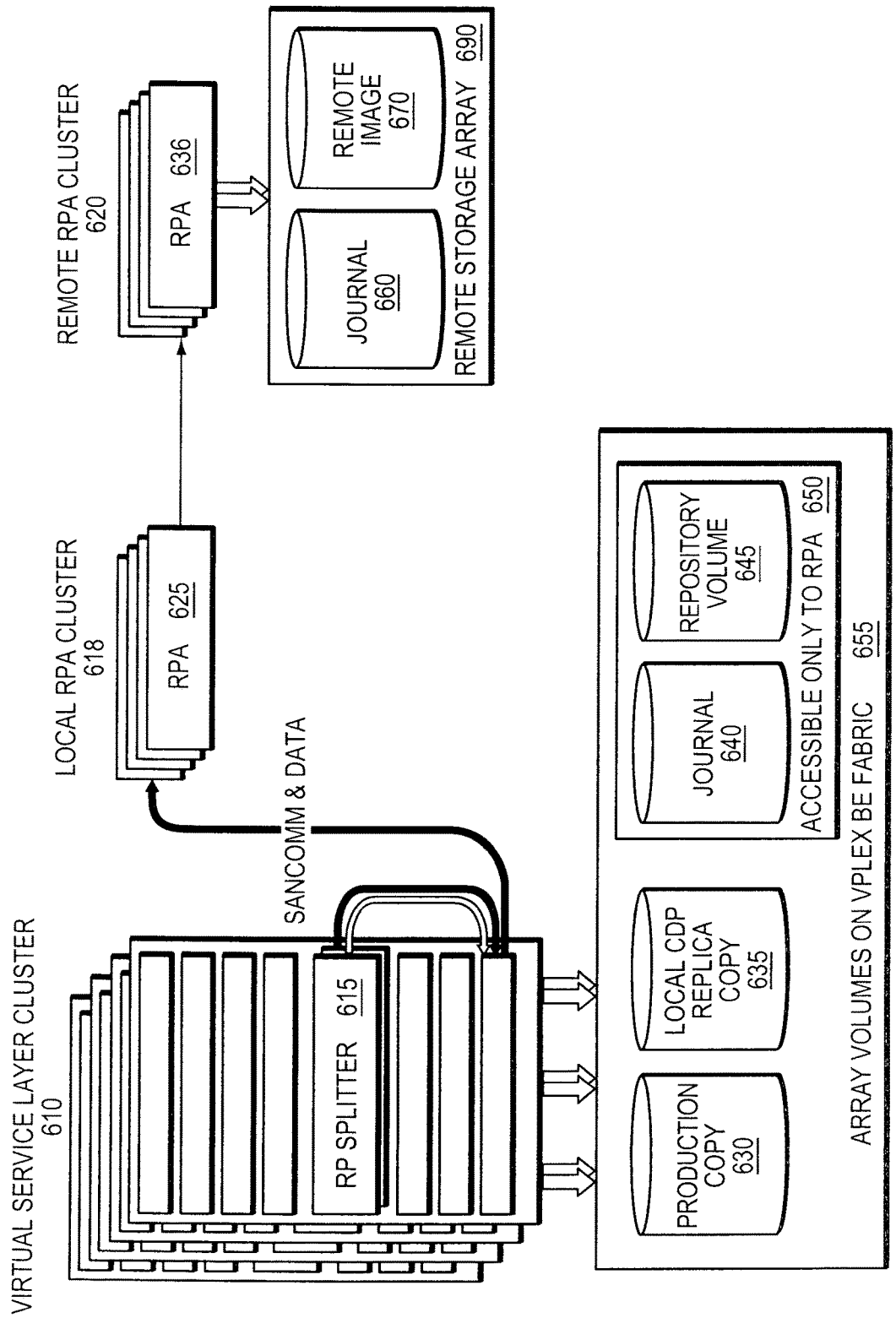
FIG. 6 is a simplified illustration of an implementation of a virtual service layer with a splitter and recovery appliance, in accordance with an embodiment of the present invention.

Refer now to the example embodiment of FIG. 6. In this example embodiment, splitter 615 communicates with recovery appliance 625. In some embodiments, the appliance may alternatively be set of process running inside the virtual service cluster. Splitter 615 splits the I/O in the virtual service layer and sends the I/O to recovery appliance 625 and to the block virtualization layer. The recovery appliance 625 may keep journal 640 of the I/O and may also keep a repository volume 645, for persistent configuration, and may keep a copy of the production image 635 serviced by the Virtual service layer 610, the appliance may also transfer the data to a remote site and create a remote copy of the data in a different storage array.

Figure 7:
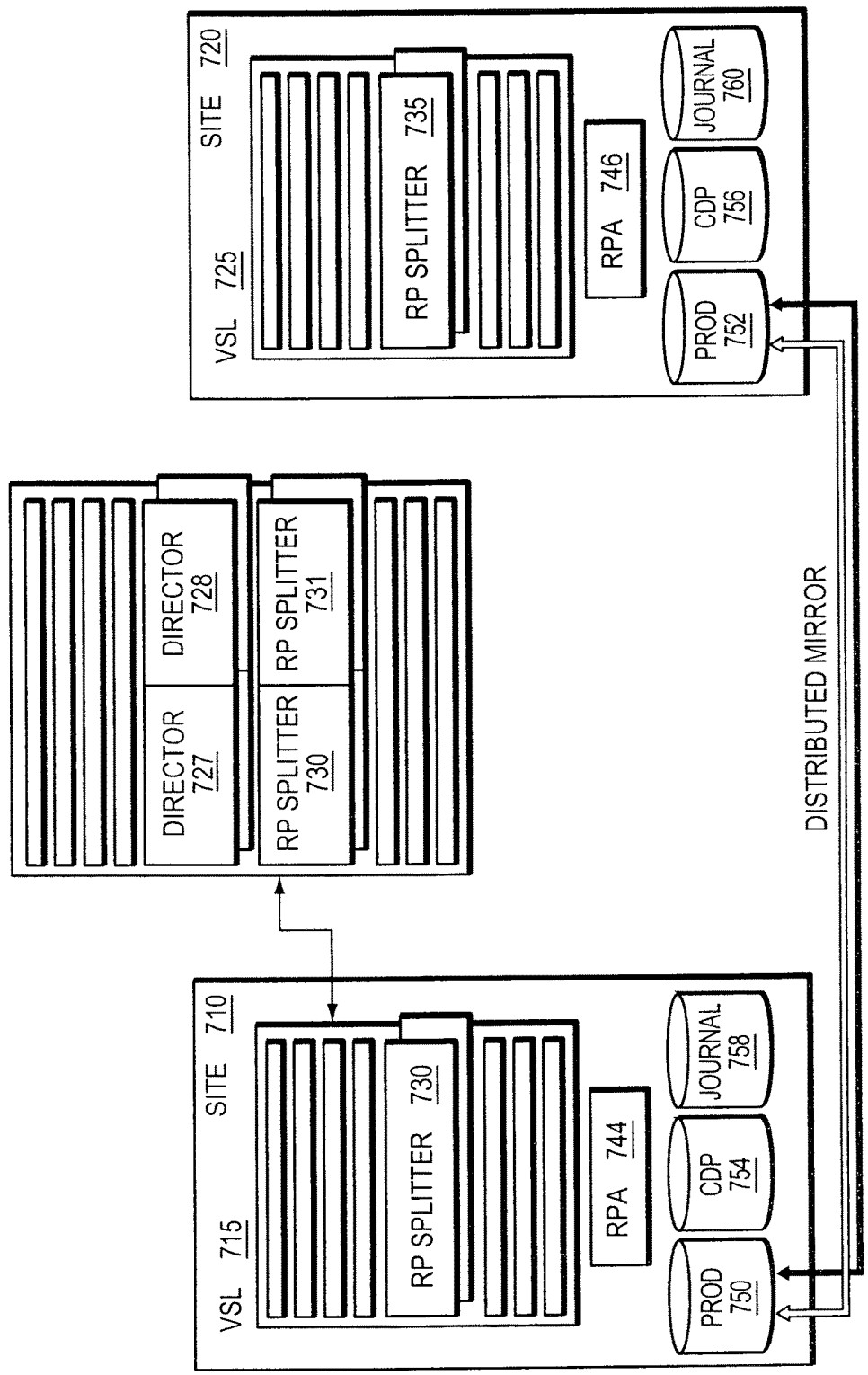
FIG. 7 is a simplified illustration of an implementation of two sites with a virtual service layer, splitters and recovery appliances, in accordance with an embodiment of the present invention.

Refer now to the example embodiment of FIG. 7. In the example embodiment of FIG. 7, sites 710 and 720 have virtual service layers 715, 725 and each VSL has a splitter, 730, and 735. The Virtual Volumes or production volumes 750 and 752 are distributed mirrors and kept consistent across sites 710, 720. Each IO performed at site 710 may be transmitted to site 720. In this example, both splitters, 730, 735 may intercept the same I/O and the same I/O may be intercepted twice. At site 710 and 720, there may be multiple directors such as directors 727 and 728. A director may be a construct that exposes the LUNs in the storage. Two directors may form a construct called an engine. Each director 727, 728 in VSL 715 may have a splitter 730, 731. All the directors at each site may expose the LUNs to hosts, the host may send each IO to one of the directors (for load balancing IOs to the same LUN may be sent to different directors), the IO arriving at a director may be intercepted by the splitter running at the same director, if the volume is a distributed mirror, the IO may also be sent to another director at the mirror site and intercepted also by the splitter running at the other director.

Figure 8:
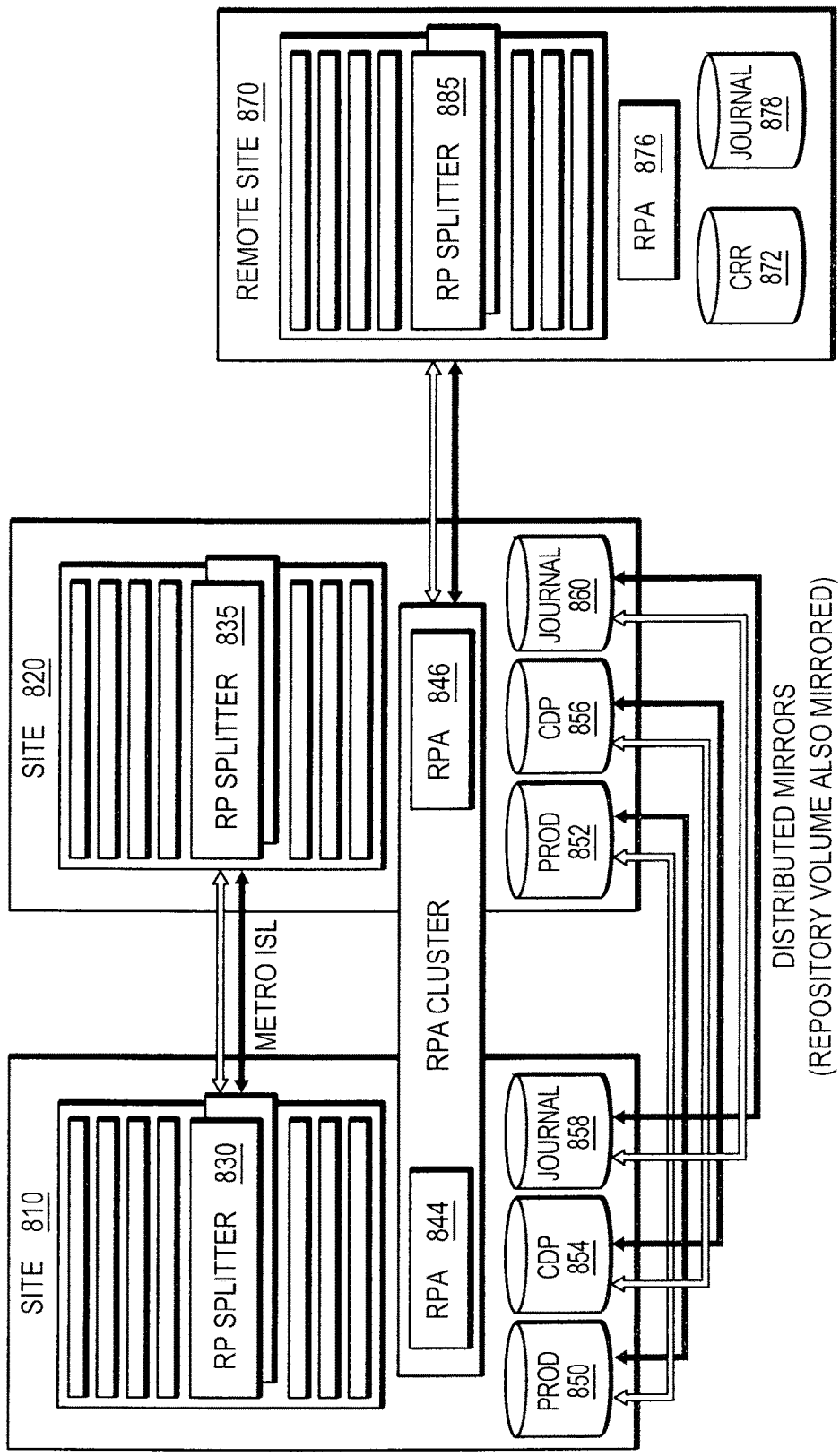
FIG. 8 is a simplified illustration of an implementation of two sites with a virtual service layer, splitters, recovery appliances, and a third remote site, in accordance with an embodiment of the present invention.

Consider now the example embodiment of FIG. 8. In the example embodiment of FIG. 8, sites 810, 820 are part of the same RPA cluster and the sites are within a metro cluster distance. Each site has a virtual service layer with a splitter. Each site has an RPA 844, 846. As well, each site has a production volume 850, 852, a Continuous Data Protection (CDP) Volume 854, 856, and a Journal 858, 860, and a repository volume 862, 864. In this embodiment, the production volumes 850, 852, CDP volumes 854, 856, and Journal volumes 858, 860 are distributively mirrored, i.e. volume 858 and 860 for instance are the same volume from the view of the RPA cluster. FIG. 8 may also have a second RPA cluster 870 and a CRR copy of the volume 875 as well as a remote journal 870, and remote splitter 885. In some embodiments, there may only be a remote copy and no CDP copy, in other embodiments, there may only be a CDP copy, and in further embodiments, there may be both a CDP and remote copy.

When replicating to CDP volume copies 854/856, the virtual service layer and the splitters are put in a fail all mode for this volume, i.e. all read and writes are fails to the volume but other SCSI commands such are read capacity and inquiry are answered. In this embodiment RPAs 844, 846 are part of one cluster and may managed as one resource, if one of the appliances fails the other appliance may take all its resources and resume the replication process, this may be possible because all the underline volumes are distributed mirrors, i.e. both appliances of the cluster see the exact same storage resources, also each appliance is connected to another physical device at a different site.

In this embodiment, each recovery appliance at each site may have a protocol to decide which recovery appliance is the lead recovery appliance and the lead recovery appliance splits the I/O, for each replicated volume or replicated consistency group. In certain embodiments, this protocol may enable a second recovery appliance to realize when another site has failed and take over replication for the failed site. In this embodiment, splitter 830 may split the I/O for a set of volumes and splitter 835 may be in a marking mode, in this marking mode the splitter intercepts all the IOs but does not send them to the relevant appliance (846), instead the splitter tracks the changed locations in memory and send the IO immediately to the block virtualization layer of the VSL, since the volume 850 is distributed, any IO to volume 850 or 852 (which is the same volume in the view of a host accessing the volume), may be intercepted by both splitter 830 and splitter 835. In this embodiment, splitter 830 may split I/O to RPA 844, and send it to the block virtualization layer of VSL. Occasionally, splitter 830 may send a synchronization command to Splitter 835.

Figure 9:
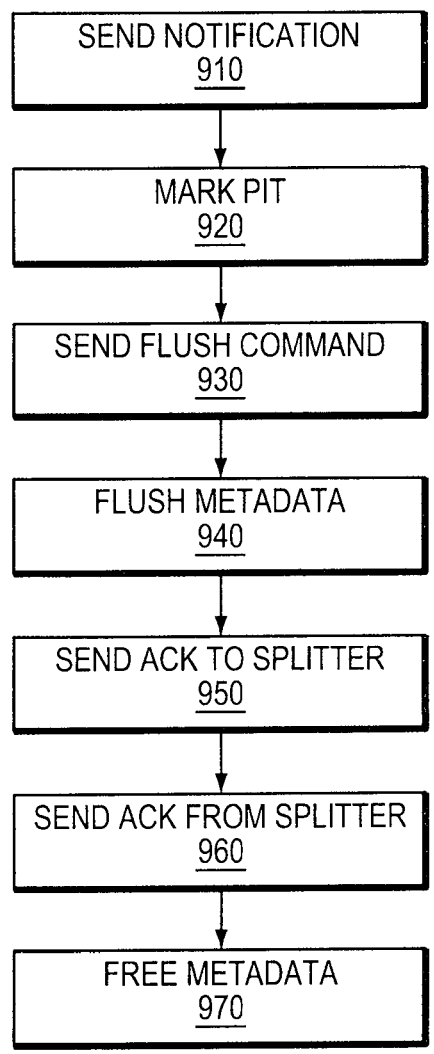
FIG. 9 is a simplified method of acknowledging a common point in time for capturing a snapshot with write order fidelity, in accordance with an embodiment of the present invention.

Consider now the example embodiments of FIGS. 8 and 9 which illustrate a synchronization mechanism according to an aspect of the current disclosure. Splitter 830 sends splitter 835 a start flushing notification (step 910). Splitter 835 marks point in time as next free point F_1 (step 920) and acknowledge splitter 830. Splitter 830 sends appliance 844 a flush delta markers command (step 930). The appliance receives the flush delta markers command and flushes the meta data of all outstanding IOs to the local journal delta marker stream (step 940). The appliances 844 send splitter 830 a flush marker command acknowledgement (step 950). Splitter 830 sends the flush marker ack command to splitter 835 (step 960). Splitter 835 may free all meta data up to free point F_1 (step 970)

Figure 10:
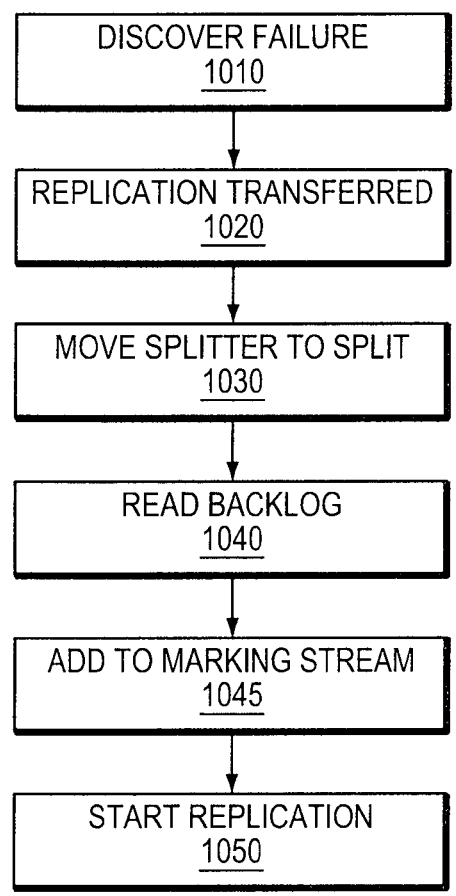
FIG. 10 is a simplified method of detecting a failure and transferring replication between sites, in accordance with an embodiment of the present invention.
Figure 11:
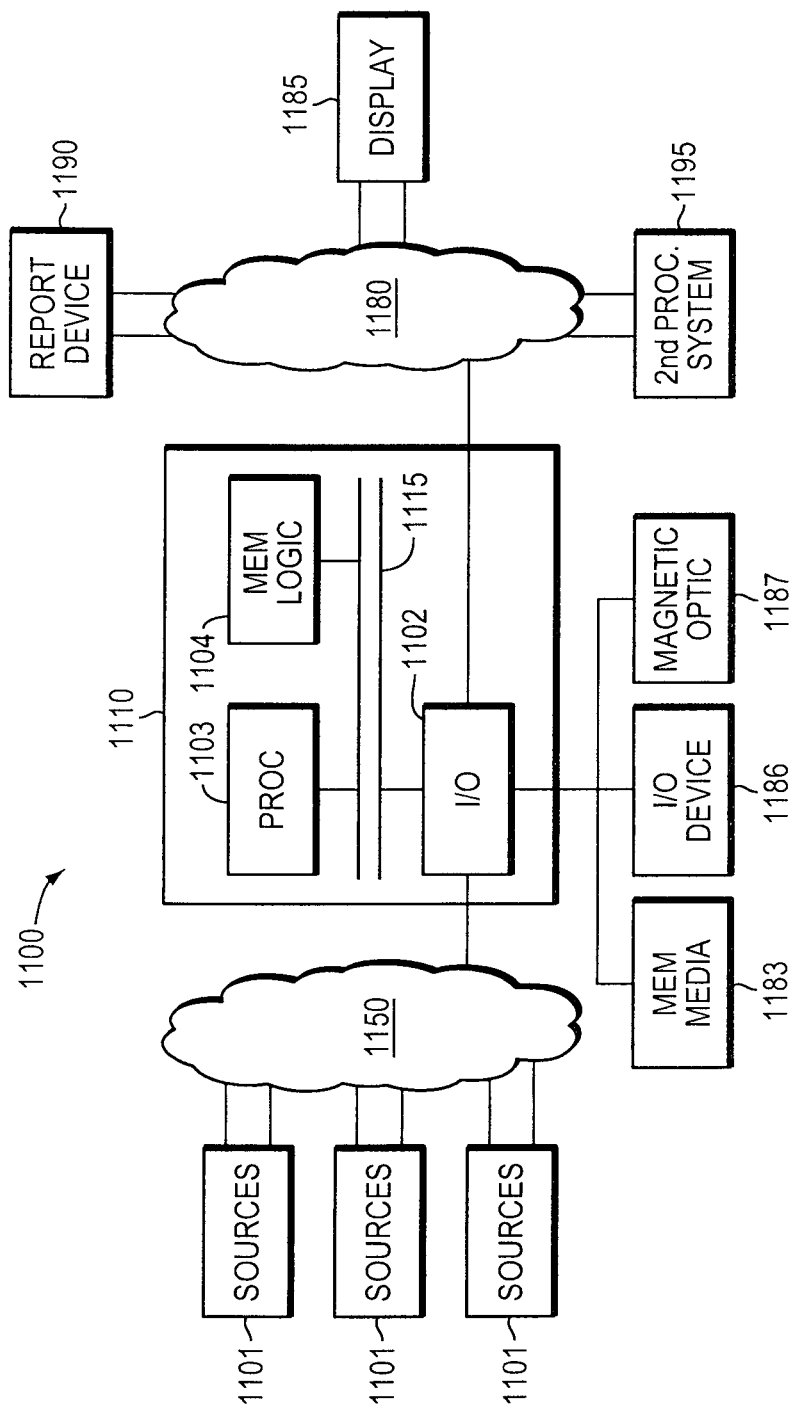
FIG. 11 is an example of an embodiment of an apparatus that may utilize the techniques described herein, in accordance with an embodiment of the present invention.
Figure 12:
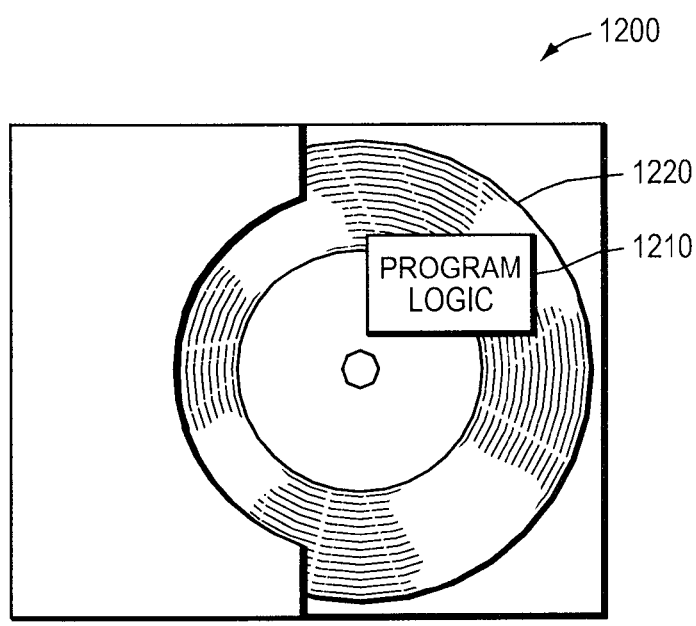
FIG. 12 is an example of an embodiment of a method embodied on a computer readable storage medium that may utilize the techniques described herein, in accordance with an embodiment of the present invention.

Refer now to the example embodiments of FIGS. 8 and 10.

If Site 810 fails, the virtual layer continues serving IOs on site 820, and splitter 835 may continue to track the changes. The failure of site 810 is discovered (step 1010). The discovery protocol may be done in a similar way to that discussed in U.S. Pat. No. 7,840,662 entitled "DYNAMICALLY MANAGING A NETWORK CLUSTER," issued on Nov. 23, 2010 to EMC Corp, which is hereby incorporated by reference.

In this embodiment the RPA cluster is a split cluster and all resources such as journal repository and replica volume are available, since the resources are distributed volumes, thus replication may continue immediately. The replication cluster management tells appliance 846 to take control of replicating production volume 852 and all other volumes in its consistency group (step 1020). Appliance 846 notifies splitter 835 to start splitting IOs to appliance 846 (step 1030). The appliance reads the last elements which remained in the marking metadata area of splitter and begins replication 835 (step 1040). The marking area is not freed due to the failure of site 810, since the free protocol may be managed by splitter 830. In this embodiment, as until the failure the free protocol was lead by site 810 and the delta marking stream is kept on the journal which is a distributed volume, the data flushed to the journal is available at site 820. The backlog containing all the meta data tracked and not freed in the memory of splitter 835 is read from the splitter 835 and added to the marking stream (1045), the marking stream contains the meta data of the data which may now arrived to the CDP and CRR copies. Replication is resumed to both CDP and CRR copy, only latest changes may need to be resynched (step 1050)

When site 810 recovers site 810 may start tracking data in MOH mode, when site 810 returns, it may have data dirty in its memory backlog. If site 810 crashes again before one phase of the free protocol is performed, such as the method of FIG. 9, there may be a need to do a complete sweep, if replication is moved to this site. After the first free protocol completes, the memory backlog may only include the latest transactions.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 15 shows Program Logic 1510 embodied on a computer-readable medium 1530 as shown, and wherein the Logic is encoded in computer-executable code configured for carrying out the reservation service process of this invention and thereby forming a Computer Program Product 1500.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for data replication, the system comprising:
a virtual service layer coupled to a first site and a second site; wherein the first site comprises a first storage medium and the second site comprises a second storage;
a distributed replication service, the distributed replication service comprising a storage medium and, communicatively coupled to a first site; and
computer-executable logic operating in memory, wherein the computer-executable program logic is configured for execution of:
enabling the virtual service layer to consume the first storage medium and the second storage medium;
mapping at least a portion of the first storage medium as a virtual storage volume and mapping at least a portion of the second storage medium as the virtual storage volume; wherein the virtual service layer presents the virtual storage volume at the first site as local to the first site and presents the virtual storage volume as local to the second site; wherein the virtual service layer enables cotemporaneous read write access to the virtual storage volume at both the first site and the second site and enables a virtual machine accessing the virtual storage volume to be transparently migrated from the first site to the second site; and
enabling the distributed replication service to create a continuous data protection image of the data written to the virtual storage volume at the first site and the data written to the virtual storage volume at the second site by creating a copy of the data written to the virtual storage volume at the first site and creating a copy of the data written to the virtual storage volume at the second site and sending the copy of the data to the distributed replication service; wherein the continuous data protection image presents an image of the one or more virtual storage volumes.

2. The system of claim 1 where in the virtual service layer has a splitter for each site.

3. The system of claim 2 wherein the computer-executable logic operating is further configured for execution of:
enabling the second site to mark a flush free point, send a flush request to first site; responding, at the first site, with a flush notification; and
using the flush notification free list of meta data, up to the flush free point.

4. The system of claim 3 wherein the computer-executable logic operating is further configured for execution of:
flushing metadata to a persistent store at the first site before sending the flush notification; and
freeing metadata from second splitter memory on a successful flush.

5. The system of claim 1 wherein the computer-executable logic operating is further configured for execution of:
upon discover of a failure of a first site, moving to a splitter on the second site to split mode;
reading metadata from the second splitter memory; and sending the metadata to a data protection appliance;
adding the metadata to a marking stream, kept on a distributed volume; and
resuming replication.

6. The system of claim 5 wherein upon the resolution of the failure of the first site, the first site is in marking on splitter mode.

7. A computer implemented method for data replication, the method comprising:

enabling a virtual service layer to consume a first storage medium on a first site and a second storage medium on a second;

mapping at least, a portion of the first storage medium as a virtual storage volume and mapping at least a portion of the second storage medium as the virtual storage volume; wherein the virtual service layer presents the virtual storage volume at the first site as local to the first site and presents the virtual storage volume as local to the second site; wherein the virtual service layer enables cotemporaneous read write access to the virtual storage volume at both the first site and the second site and enables a virtual machine accessing the virtual storage volume to be transparently migrated from the first site to the second site; and enabling the distributed replication service to create a continuous data protection image of the data written to the virtual storage volume at the first site and the data written to the virtual storage volume at the second site by creating a copy of the data written to the virtual storage volume at the first site and creating a copy of the data written to the virtual storage volume at the second site and sending the copy of the data to the distributed replication service; wherein the continuous data protection image presents an image of the one or more virtual storage volumes.

8. The method of claim 7 wherein the virtual service layer has a splitter for each site.

9. The method of claim 8 further comprising:

enabling the second site to mark a flush free point, send a flush request to first site; responding, at the first site, with a flush notification; and using the flush notification free list of meta data, up to the flush free point.

10. The method of claim 9 further comprising:

flushing the metadata to a persistent store at the first site before sending the flush notification; and freeing meta data from second splitter memory on a successful flush.

11. The method of claim 8 further comprising:

upon discover of a failure of a first site, moving to the splitter on a second site to split mode;

reading the metadata from the second splitter memory; and sending the meta data to the appliance adding the metadata to the marking stream, kept on a distributed volume; and resuming the replication.

12. The method of claim 11 wherein upon the resolution of the failure of the first site, the first site is, in marking on splitter mode.

13. A computer program product comprising:

a non-transitory computer readable medium encoded with computer executable program code, the code:

enabling a virtual service layer to consume a first storage medium on a first site and a second storage medium on a second;

mapping at least a portion of the first storage medium as a virtual storage volume and mapping at least a portion of the second storage medium as the virtual storage volume; wherein the virtual service layer presents the virtual storage volume at the first site as local to the first site and presents the virtual storage volume as local to the second site; wherein the virtual service layer enables cotemporaneous read write access to the virtual storage volume at both the first site and the second site and enables a virtual machine accessing the virtual storage volume to be transparently migrated from the first site to the second site; and enabling the distributed replication service to create a continuous data protection image of the data written to the virtual storage volume at the first site and the data written to the virtual storage volume at the second site by creating a copy of the data written to the virtual storage volume at the first site and creating a copy of the data written to the virtual storage volume at the second site and sending the copy of the data to the distributed replication service; wherein the continuous data protection image presents an image of the one or more virtual storage volumes.

14. The computer program product of claim 13, wherein the virtual service layer has a splitter for each site.

15. The computer program product of claim 14, wherein the code further enables:

enabling the second site to mark a flush free point, send a flush request to first site; responding, at the first site, with a flush notification; and using the flush notification free list of meta data, up to the flush free point.

16. The computer program product of claim 15, wherein the code further enables:

flushing metadata to a persistent store at the first site before sending the flush notification; and freeing metadata from second splitter memory on a successful flush.

17. The computer program product of claim 13, wherein the code further enables upon discover of a failure of a first site, moving to the splitter on a second site to split mode;

reading the metadata from the second splitter memory; and sending the meta data to the appliance adding the metadata to the marking stream, kept on a distributed volume; and resuming the replication.

18. The computer program product of claim 17 wherein upon the resolution of the failure of the first site, the first site is in marking on splitter mode.

19. The system of claim 1 wherein a virtual machine is able to access the data of the virtual storage volume regardless of whether the virtual machine is on the first site or the second site.

20. The system of claim 1 the computer-executable logic operating in memory, further configured for execution of:

transferring a virtual machine accessing the one or more virtual storage volumes from the first site to the second site transparently to the virtual machine.

* * * * *